United States Patent
Al-Mufti et al.

(10) Patent No.: US 12,074,687 B2
(45) Date of Patent: Aug. 27, 2024

(54) SYSTEMS AND METHODS FOR DIMINISHING ADJACENT CHANNEL INTERFERENCE BETWEEN RADIOS USING SHARED FREQUENCY SPECTRUM

(71) Applicant: CommScope Technologies LLC, Hickory, NC (US)

(72) Inventors: Khalid W. Al-Mufti, Sterling, VA (US); Ariful Hannan, Sterling, VA (US)

(73) Assignee: CommScope Technologies LLC, Claremont, NC (US)

( * ) Notice: Subject to any disclaimer, the term of this patent is extended or adjusted under 35 U.S.C. 154(b) by 307 days.

(21) Appl. No.: 17/572,410

(22) Filed: Jan. 10, 2022

(65) Prior Publication Data

US 2022/0224408 A1    Jul. 14, 2022

Related U.S. Application Data (60) Provisional application No. 63/136,331, filed on Jan. 12, 2021.

(51) Int. Cl.
| | | |
|---|---|---|
| H04W 16/14 | (2009.01) | |
| H04B 7/26 | (2006.01) | |
| H04L 5/14 | (2006.01) | |

(52) U.S. Cl.
CPC ........... *H04B 7/265* (2013.01); *H04L 5/1461* (2013.01); *H04W 16/14* (2013.01)

(58) Field of Classification Search
CPC ...... H04B 7/265; H04W 16/14; H04W 24/02; H04W 24/08; H04W 24/10; H04W 72/0453; H04W 72/541

USPC .................................................. 370/252, 329
See application file for complete search history.

(56) References Cited

U.S. PATENT DOCUMENTS

| | | |
|---|---|---|
| 8,040,844 B2 | 10/2011 | Olexa et al. |
| 10,681,560 B1 | 6/2020 | Sevindik et al. |
| 10,999,844 B2 | 5/2021 | Sevindik et al. |
| 11,451,969 B2 | 9/2022 | Furuichi et al. |
| 11,617,087 B2 | 3/2023 | Cimpu et al. |
| 2006/0263252 A1 | 11/2006 | Sanchez-Olea et al. |
| 2008/0112360 A1 | 5/2008 | Seidel et al. |
| 2009/0088083 A1 | 4/2009 | Fujii et al. |
| 2010/0330919 A1 | 12/2010 | Gurney et al. |
| 2015/0092700 A1 | 4/2015 | Li et al. |
| 2015/0119059 A1 | 4/2015 | Miao et al. |
| 2015/0264135 A1 | 9/2015 | Kandula et al. |
| 2016/0004787 A1 | 1/2016 | Shinkuma et al. |
| 2016/0088485 A1 | 3/2016 | Guo et al. |
| 2016/0182139 A1 | 6/2016 | Yi et al. |
| 2017/0208474 A1 | 7/2017 | Mody et al. |
| 2017/0318470 A1 | 11/2017 | Srikanteswara et al. |

(Continued)

OTHER PUBLICATIONS

U.S. Patent and Trademark Office, "Notice of Allowance", U.S. Appl. No. 17/720,056, filed Jan. 11, 2024, pp. 1 through 16, Published: US.

(Continued)

*Primary Examiner* — Harun Chowdhury
(74) *Attorney, Agent, or Firm* — Fogg & Powers LLC (57) ABSTRACT

Techniques are provided for diminishing adjacent channel interference between radios using shared frequency spectrum. A guard band may be inserted between a pair of adjacent frequency spectrums so that they are no longer adjacent.

15 Claims, 4 Drawing Sheets

(56) References Cited

U.S. PATENT DOCUMENTS

| | | | |
|---|---|---|---|
| 2017/0374558 | A1 | 12/2017 | Zhao et al. |
| 2018/0139616 | A1 | 5/2018 | Khoshnevisan et al. |
| 2019/0007909 | A1 | 1/2019 | Mueck et al. |
| 2019/0141713 | A1 | 5/2019 | Cimpu et al. |
| 2019/0174359 | A1 | 6/2019 | Hannan |
| 2019/0223037 | A1 | 7/2019 | Raghothaman |
| 2020/0053669 | A1 | 2/2020 | Hannan et al. |
| 2020/0187133 | A1 | 6/2020 | Syed et al. |
| 2020/0351899 | A1 | 11/2020 | Sun et al. |
| 2021/0044984 | A1 | 2/2021 | Sun et al. |
| 2021/0076223 | A1 | 3/2021 | Taneja et al. |
| 2021/0144724 | A1 | 5/2021 | Macmullan et al. |
| 2021/0211880 | A1 | 7/2021 | Khawer et al. |
| 2021/0337391 | A1 | 10/2021 | Sevindik et al. |
| 2021/0345121 | A1 | 11/2021 | Cimpu |
| 2021/0345352 | A1* | 11/2021 | Zhao .................... H04W 24/10 |
| 2021/0360627 | A1* | 11/2021 | Hafeez .............. H04W 72/0453 |
| 2021/0400498 | A1 | 12/2021 | Ioffe et al. |
| 2022/0095264 | A1 | 3/2022 | Cook |
| 2022/0225109 | A1 | 7/2022 | Al-Mufti et al. |
| 2022/0345895 | A1 | 10/2022 | Al-Mufti et al. |
| 2022/0346029 | A1 | 10/2022 | Al-Mufti et al. |
| 2022/0346030 | A1 | 10/2022 | Al-Mufti et al. |
| 2022/0400487 | A1 | 12/2022 | Sevindik |
| 2023/0007668 | A1 | 1/2023 | Al-Mufti et al. |
| 2023/0012713 | A1 | 1/2023 | Khalid et al. |
| 2023/0071539 | A1 | 3/2023 | Dijkstra et al. |
| 2023/0093833 | A1 | 3/2023 | Hafeez et al. |

OTHER PUBLICATIONS

U.S. Patent and Trademark Office, "Notice of Allowance", U.S. Appl. No. 17/703,640, dated Feb. 5, 2024, pp. 1 through 13, Published: US.

Wireless Innovation Forum, "WINNF-SSC-0010, Signaling Protocol and Procedures for Citizens Broadband Radio Service (CBRS): Winnforum Recognized CBRS Grouping Information" V4.2.0, Jun. 30, 2021, Page(s): Title page through 8.

Wireless Innovation Forum, "WINNF-TS-0061, Test and Certification for Citizens Broadband Radio Service (CBRS); Conformance and Performance Test Technical Specifictation; SAS as Unit Unter Test (UUT)", V1.5.1, Oct. 7, 2019, Page(s) Title Page through 180.

Wireless Innovation Forum, WINNF-TS-0112, Requirements for Commercial Operation in the U.S. 3550-3700 MHZ Citizens Broadband Radio Service Band, V1.9.1, Mar. 11, 2020, Page(s) Title page through 76.

Wireless Innovation Forum, "WINNF-TS-0112, Requirements for Commercial Operation in the U.S. 3550-3700 Mhz Citizens Broadband Radio Service Band" V1.4.1, Jan. 16, 2018, Page(s): Title Page through 69.

U.S. Patent and Trademark Office, "Office Action", U.S. Appl. No. 17/703,640, filed Oct. 6, 2023, pp. 1 through 11, Published: US.

U.S. Patent and Trademark Office, "Notice of Allowance", U.S. Appl. No. 17/703,632, dated Jun. 11, 2024, pp. 1-31, Published: US.

* cited by examiner

SYSTEMS AND METHODS FOR DIMINISHING ADJACENT CHANNEL INTERFERENCE BETWEEN RADIOS USING SHARED FREQUENCY SPECTRUM

BACKGROUND

A citizens broadband radio service (CBRS) includes incumbent users of shared spectrum and secondary users of shared spectrum. An incumbent user may also be referred to as a primary user. Incumbent users have priority access to transmit in the spectrum shared with the secondary users. If a secondary user seeks permission to transmit on spectrum shared by incumbent user(s) and/or other secondary user(s), it will only be permitted to do so to the extent its transmissions do not raise aggregate interference at the incumbent user(s) and/or other secondary user(s) above corresponding interference threshold levels for each of such incumbent user(s) and secondary user(s).

Such secondary users use citizens broadband radio service device(s) (CBSD(s)). A CBSD is a radio including a transmitter coupled to an antenna. A CBRS system includes a spectrum access system (SAS) which regulates the transmissions of CBSD(s) in shared spectrum under the SAS's control, e.g., whether each CBSD of a SAS can transmit in the shared spectrum, and if so, then at what power level, to ensure that aggregate interference at incumbent users and other CBSDs is within appropriate limits. The SAS also may include a function to coordinate the shared spectrum usage among secondary users that are General Authorized Access (GAA) CBSDs to diminish interference between GAA CBSDs and to regulate interference from GAA CBSD(s) at certain location(s), e.g., geographic location(s) of incumbent user(s), of protection area(s), and of exclusion zone(s).

CBSD(s) typically use time division duplexing (TDD). However, not all TDD CBSD(s) may be synchronized to transmit and receive at the same time.[1] This can arise because CBSDs use different TDD transmit and receiving synchronization timing; optionally, this may arise because the CBSDs use different air interfaces. CBSDs which are not synchronized to transmit and receive at the same times are deemed to be TDD unsynchronized. CBSD(s) that are TDD unsynchronized (and, e.g., that are geographically proximate) may interfere with one another if they operated on frequency spectrum that is adjacent. Even if transmissions are in an adjacent frequency spectrum, a receiver may be desensitized by such transmissions.

[1] Thus, TDD synchronized means that two or more TDD CBSDs are configured to transmit and receive at the same time.

SUMMARY OF THE INVENTION

A program product is provided. The program product comprises a non-transitory processor readable medium on which program instructions are embodied, wherein the program instructions are configured, when executed by at least one programmable processor, to cause the at least one programmable processor to: determine whether there is at least one pair of adjacent frequency spectrums, wherein each pair of the adjacent frequency spectrums comprises two frequency spectrums which are adjacent and each of which is allocated to a unique color assigned to one node of a pair of nodes of a network graph, wherein the pair of adjacent frequency spectrums do not overlap and wherein one end of one frequency spectrum of the pair of adjacent frequency spectrum is within a predefined threshold frequency of another end of another frequency spectrum of the pair of adjacent frequency spectrums, wherein an edge is formed between each node of the pair of nodes, wherein each radio comprising one node of the pair of nodes is time domain duplexing unsynchronized with each radio comprising another node of the pair of nodes, and wherein an edge is a criterion of interference at a radio or at a node exceeds a first interference threshold level; and determine that there is at least one pair of adjacent frequency spectrums, then insert a guard band between each frequency spectrum of each pair of adjacent frequency spectrums so that one end of one frequency spectrum of the pair of adjacent frequency spectrum is no longer within the predefined threshold frequency of another end of another frequency spectrum of the pair of adjacent frequency spectrums; wherein the pair of adjacent frequency is within a shared frequency spectra.

DRAWINGS

Comprehension of embodiments of the invention is facilitated by reading the following detailed description in conjunction with the annexed drawings, in which.

DETAILED DESCRIPTION

Embodiments of an invention provide techniques for inserting a guard band between two nodes assigned adjacent frequency spectrums, where the CBSD(s) comprising one node are transmitting while CBSD(s) comprising the other node are receiving—at least for a portion of the time; thus, transmitting CBSD(s) of one node can desensitize receiving CBSD(s) of the other node. Desensitizing a receiver of CBSD(s) may be characterized by increasing the signal to interference plus noise ratio (SINK). If there is insufficient bandwidth for the adjacent frequency spectrums and guard band(s) in incumbent user free spectrum (or incumbent free spectrum), then frequency spectrum(s) and/or guard band(s) may be moved to frequency spectrum co-channel with incumbent user(s). Co-channel means same as or a subset of.

The CBSD(s) of each node can be TDD CBSD(s). Thus, both nodes can comprise TDD CBSDs.

Periodically, planned spectrum allocation is performed for GAA CBSDs by a SAS. The GAA and PAL CBSDs are controlled by the SAS or other SAS(s). Upon performing planned spectrum allocation for CBSDs, a network graph is generated. The network graph means a graphical representation of a network and comprises at least one node. Node means at least one GAA CBSD, where if the node comprises two or more GAA CBSD(s) each GAA CBSD utilizes the same frequency spectrum and is free of interference (as defined elsewhere herein) from each of the other GAA CBSD(s) comprising the node.

The network graph comprises connected set(s). CBSDs may be operated using time domain duplexing (TDD). At least two nodes of different colors (of a connected set in the network graph) may be TDD unsynchronized. A connected set means a unique set of the network graph and of at least two nodes, where at least two of the nodes have an edge, or a node with no edge to any other node. TDD unsynchronized means that CBSD(s) comprising one node do not transmit and receive during the same transmit time slots and receive time slots as CBSD(s) comprising another node.

Each of the at least two nodes may be unsynchronized nodes because CBSD(s) comprising one node uses a different air interface protocol then CBSD(s) comprising another node, and thus are TDD unsynchronized, or even if the CBSDs comprising each of the two nodes use the same air interface, the CBSD(s) comprising each node are not TDD synchronized, e.g., not using the same TDD configuration. When CBSDs are not TDD synchronized they do not always transmit and receive at the same time. Optionally, when different air interfaces are used by two nodes connected by an edge, CBSD(s) of one node may use a Long-Term Evolution (LTE) air interface, and CBSD(s) of another node use another air interface, e.g., an IEEE802.16 compliant air interface such as Worldwide Interoperability for Microwave Access (WiMAX). An edge means that a criterion of interference at a CBSD or a node consisting of one or more CBSD(s) exceeds a threshold level. Optionally, the threshold level is an interference threshold level, and optionally the interference threshold level may be −96 dBm/10 MHz. Further, because they use different air interfaces, it may not be possible to TDD synchronize CBSDs using these different air interfaces. Thus, CBSD(s), utilizing one air interface, of one node may transmit and receive using TDD in a manner unsynchronized with the CBSD(s), using another air interface, of another node. Because the nodes have different colors, two nodes may have an edge between them and operate in non-overlapping frequency spectrum.

If the frequency spectrum assigned to each node, of a pair of nodes connected with an edge, is adjacent, then receiver(s) of CBSD(s) of one node may be desensitized by the transmission of transmitter(s) of CBSD(s) of the other node, when the CBSD(s) of the one node are not TDD synchronized with CBSD(s) of the other node. Adjacent as used herein means that two frequency spectra do not overlap but where one end of one frequency spectrum is within a predefined threshold frequency, e.g., zero or greater than zero frequency, of another end of the other frequency spectrum. Pair of adjacent frequency spectrums means two frequency spectrums that are adjacent. Optionally, the predefined threshold frequency may be between zero to 2.4 MHz or within another frequency range. The predefined threshold frequency may be determined based upon the spectral content transmitted by CBSD(s) of each node connected by an edge, or may be selected by the system designer or user. To avoid desensitization, a guard band is inserted between the two frequency spectra.

Although embodiments of the invention are applicable to and may be exemplified in the context of CBRS for pedagogical purposes, the embodiments are applicable to other shared spectrum systems, such as for example licensed spectrum access systems or authorized access systems. Thus, for example, a CBSD may be more generally referred to as a radio. Frequency spectrum means a bandwidth centered about a center frequency. Shared spectrum (or shared frequency spectrum) means frequency spectra utilized by at least two of incumbent user(s), grandfather wireless protection zone(s), environmental sensing capability system receiver(s), fixed satellite service (FSS), priority access license (PAL) CBSD(s), radars (e.g., on-ground or ship-borne, and which optionally may be used by military) and GAA CBSD(s).

Unless otherwise indicated herein, power as used herein means power or power spectral density. Power levels for a shared spectrum system, such as a CBRS, are often characterized in terms of power spectral density levels.

A CBRS system comprises general authorized access (GAA) and/or PAL CBSDs, and higher priority users. The higher priority users, such as government users fixed satellite service receiver(s), have priority access to some or all of spectrum in the shared spectrum. A SAS grants the CBSDs access to the shared spectrum, including authorizing frequency spectrum (or channels) requested by CBSDs, and authorizing a corresponding requested maximum transmission power or assigning a lower maximum transmission power. The SAS controls the transmission of GAA CBSDs so that PAL CBSDs and the higher priority users are free of interference from GAA CBSDs. The GAA and PAL CBSDs are secondary users; the PAL CBSDs are secondary users because they have a lower priority than higher priority users (i.e., incumbent users) such as for example naval vessels. PAL and GAA CBSDs have to also protect Environmental Sensing Capability (ESC) sensors which are used to detect naval radar in the CBRS band. The SAS also controls the transmission of PAL CBSDs so that higher priority users are free of interference from PAL CBSDs.

Free of interference as used herein does not mean an absence of interference, but rather means an acceptable level of interference (i.e., a level of interference below a threshold level of interference) which may be no interference or a finite level of interference; thus, to determine if a geographic location, e.g. of an incumbent user or a secondary user is free of interference, whether the interference level is below the acceptable level of interference (or a threshold interference) is determined. The acceptable level of interference may vary by geography, frequency spectrum, incumbent type, license type, whether CBSD is licensed, and/or other indicia.

GAA CBSDs may be of two types: category A (low transmission power) and category B (high transmission power). Category A has a maximum transmission power spectral density of 30 dBm/10 MHz. Category B has a maximum transmission power spectral density of 47 dBm/10 MHz.

Higher priority users of shared spectrum have first, or highest, priority to utilize the shared spectrum controlled by the SAS. Thus, higher priority users (e.g., the receivers of higher priority users' communications systems or radios) shall be able to operate free of interference from other users, e.g., communications systems of priority access licensees and general authorized access users. Communications systems, as used herein, shall include Environmental Sensing Capability (ESC) receivers and satellite ground stations.

In one embodiment, PAL users have second (or intermediate) priority, after higher priority users (excluding PAL users), to utilize the frequency spectrum controlled by the SAS. In another embodiment, a PAL user shall be able to operate, when higher priority users (excluding PAL users) are free of interference of such a PAL user, and free of interference from other PAL users and general authorized access users. In one embodiment, an ability of a PAL user to operate free of interference shall be limited temporally, geographically, and spectrally within the specifications of its license.

GAA users have third, or lowest, priority to utilize the frequency spectrum controlled by the SAS. In one embodiment, an operation of GAA users will be governed by laws, regulations, and/or rules (e.g., pertaining to CBRS). Such laws, regulations, and/or rules may be established by government(s) and/or standards bodies (e.g., Wireless Innovation Forum or WInnForum). For example, such rules shall only let GAA users' CBSDs operate when they do not interfere with communication systems of higher priority users.

In one embodiment, the geographic coverage area proximate to (e.g., covered by radio frequency emissions of) the CBSD may include exclusion zones and protection point regions (including location(s) of fixed satellite service(s) (FSS(s)), priority access license (PAL) protection area(s) (PPA(s)), grandfathered wireless protection zone(s) (GWPZ(s)), dynamic protection area(s) (DPA(s)), and receiver(s) of environmental sensing capability (ESC) system(s)) (or ESC system receiver(s)). CBSDs are prohibited from operating in specific frequency spectrum in exclusion zones. Further, the level of interference generated by CBSD(s) shall be limited in a protection point region so as not to interfere with certain communications systems, for example an ESC receiver or an FSS receiver. CBSDs may only operate with the permission of the SAS when an incumbent user's communication system is operating in a protection zone. In some cases, this operation will be based upon information received by an environmental sensing capability (ESC) system, from central database(s), notification from an incumbent user, and/or from a beacon indicating that secondary users should not use a certain portion of frequency spectrum. One type of protection point region is the grandfathered wireless protection zone which is a geographic area and/or frequency spectrum where grandfathered wireless broadband licensees can operate free of interference, e.g., of CBSDs. The foregoing are examples of exclusion zones and protection point regions; other type of exclusion and protection point regions may occur.

For a CBRS system, a higher priority user consists of a user consisting of at least one of: at least one incumbent user, at least one ESC system receiver, at least one FSS, at least one PAL radio, and at least one GWPZ. Optionally, the at least one incumbent user includes government entities operating systems such as communications systems, operators of fixed satellite communications systems, and grandfathered, prior licensees of the frequency spectrum.

The invention can be subsequently described in more general terms, e.g., using the term radio rather than CBSD, and shared spectrum system rather than CBRS. However, the terms CBRS and CBSD may be subsequently used when illustrating such a system and a device, or their specifications. Thus, a CBSD may be more generally referred to as a radio. Radio means a radio whose transmission is controlled or regulated by a spectrum access system.

Figure 1:
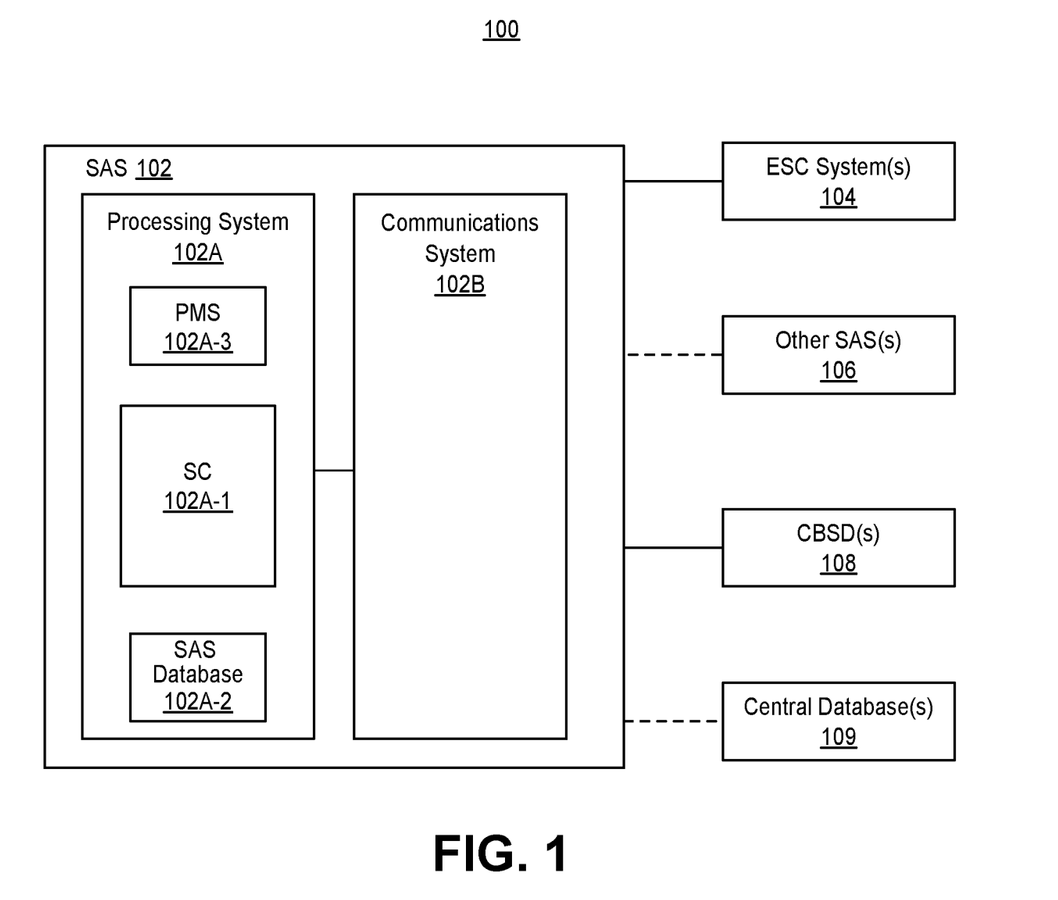
FIG. 1 illustrates a block diagram of one embodiment of a shared spectrum system configured diminish interference between at least one pair of nodes connected by an edge, where each node comprises citizens broadband radio service device(s) using time domain duplexing, and where the citizens broadband radio service device(s) of each node are not time domain duplexing synchronized.

FIG. 1 illustrates a block diagram of one embodiment of a shared spectrum system 100 configured diminish interference between at least one pair of nodes connected by an edge, where each node comprises CBSD(s) using time domain duplexing, and where the CBSD(s) of each node are not time domain duplexing synchronized. The shared spectrum system 100 comprises a SAS configured to permit radios access to share spectrum prior to a planned time (SAS) 102 and communicatively coupled to at least one CBSD (CBSD(s)) 108 whose transmissions are controlled or regulated by the SAS 102. Each CBSD is operated by a general authorized access user and/or a priority access licensee.

Optionally, the SAS 102 is coupled to at least one environmental sensing capability system (ESC system(s)) 104. Optionally, the SAS 102 is coupled to central database(s) 109, e.g., which has information about incumbent users (e.g., type of incumbent user(s), interference threshold power level of incumbent user(s), location of protection points corresponding to incumbent user(s)), and/or when certain incumbent users (such as satellite ground stations) and/or PAL CBSDs are scheduled to transmit in the shared spectrum.

Optionally, the SAS 102 is coupled to at least one other SAS (other SAS(s)) 106. The other SAS(s) 106 are configured to control the transmissions of other CBSD(s) (in the same shared spectrum in which the CBSD(s) 108 transmit or in overlapping frequency spectrum) and which are geographically proximate to the CBSD(s) 108. For example, such other CBSDs controlled by other SAS(s) 106 may include PAL and GAA users.

CBSD(s) (whose transmissions are controlled by other SAS(s) 106) may generate electromagnetic energy that overlaps the geographic region and frequency spectrum of the CBSD(s) 108 controlled by SAS 102, and thus must be accounted for by the SAS 102 when the SAS 102 performs interference analysis and authorizes transmission by CBSD(s) 108 in the shared spectrum. Alternatively, the shared spectrum system 100 and its PALs and GAA users, may generate electromagnetic energy that overlaps the geographic region of the other SAS(s) 106, and thus must be accounted for by the other SAS(s) 106 when the other SAS(s) 106 perform interference analysis, and authorize operation of CBSDs of PALs and GAA users (whose transmissions are controlled by the other SAS(s) 106). By coupling SASs whose CBSDs are geographically proximate to one another, each SAS can account for electromagnetic energy emitted from proximate CBSD(s) in those geographies.

Each ESC system detects, and communicates to the SAS 102, the dynamic presence of signal(s), e.g., from some incumbent user(s), such as radars. Alternatively, incumbent users can inform the SAS 102 that they are operating, e.g., by transmitting a signal beacon, or communicating with the central database(s) 109 which may be coupled to the SAS 102.

The SAS 102 also controls the operation (e.g., power levels and frequencies of operation) of the GAA user(s)' CBSD(s) so that the PAL CBSD(s) operate free of interference. In one embodiment, the SAS 102 includes a processing system 102A coupled to a communications system 102B. The processing system 102A controls the operation of CBSD(s) 108 that form part of the shared spectrum system 100.

The communications system 102B facilitates communications between the SAS 102 and other systems or devices, e.g., the CBSD(s) 108, the ESC system(s) 104, the central database(s) 109, and/or the other SAS(s) 106. In one embodiment, the communications system 102B includes a modem, e.g., an Internet data modem, a transceiver, and/or any other communications device(s) that can facilitate communications between the aforementioned devices.

Optionally, the processing system (or processing system circuitry) 102A may be a state machine, a neural network, and/or a quantum computer. If the processing system 102A includes a state machine, then optionally the state machine may comprise processor circuitry coupled to memory circuitry.

The SAS 102, e.g., the processing system 102A, comprises a spectrum coordination system (SC) 102A-1, and a SAS database 102A-2. Optionally, the SAS 102 includes a power modelling system (PMS) 102A-3. Optionally, the SC 102A-1 is implemented by software stored in the memory circuitry and executed by the processor circuitry, and the SAS database 102A-2 comprises data stored in the memory circuitry and processed by the processor circuitry. The components of the SAS 102 are provided for illustrative purposes only; other component(s) may be instead of those illustrated in FIG. 1.

The spectrum coordination system 102A-1 is configured to allocated frequency spectrum and a corresponding maximum transmit power to the each CBSD which has requested access to shared spectrum in which the SAS 102 controls CBSD(s) 108 ability to transmit. The spectrum coordination system 102A-1 also determines the maximum transmission power of CBSDs so that protection point(s) (which represents actual and/or potential incumbent user(s) and/or regions which are to remain free of interference from CBSDs) will be free of interference. The spectrum coordination system 102A-1 does so by assessing aggregate interference at each protection point having a neighborhood encompassing geographic location(s) of CBSD(s), where the aggregate interference is generated by such CBSD(s) in the neighborhood. Neighborhood means a geographic area such as a circle or other shape centered around a protection point. Finally, the spectrum coordination system 102A-1 is further configured to configured diminish interference between at least one pair of nodes connected by an edge, where each node comprises CBSD(s) using time domain duplexing, and where the CBSD(s) of each node are not TDD synchronized. Thus, optionally, the spectrum coordination system 102A-1 is configured to implement the methods illustrated in FIGS. 2 and/or 3.

Protection points may correspond to different types of incumbent users. An interference threshold level for a protection point may depend on a type of incumbent user that the protection point represents. Interference threshold levels may vary amongst incumbent user types.

Optionally, determination of maximum transmission power may be implemented with power allocation process that operates substantially accordingly to WInnForum general requirement R2-SGN-16 and using an iterative allocation process (IAP); however, WInnForum general requirement (requirement) R2-SGN-16 of WINNF-TS-0112 defines the IAP, and WINNF-TS-0112 is incorporated by reference herein in its entirety. The IAP determines maximum transmit power levels by allocating interference margin fairly to CBSDs in neighborhood(s) of protection point(s) proximate to the CBSDs. The IAP determines such transmit power levels by allocating interference margin fairly to the CBSDs in neighborhoods of protection point(s) of incumbent(s) for a certain combination of frequency spectrum mapped to the CBSDs. WInnForum general requirement (requirement) R2-SGN-16 of WINNF-TS-0112 defines the IAP, and is incorporated by reference herein in its entirety. However, the power allocation system may be implemented in other ways to allocate, e.g., equitably, maximum transmission power of CBSDs.

The PMS 102A-3 is configured to model interference between two geographic points using at least one propagation model, and may be used by the SC 102A-1. However, in other embodiments, the function provided by the PMS 102A-3 may be integrated in the SC 102A-1 The propagation model(s) may be used to determine path loss between geographic points; knowing a transmit power of a CBSD in the shared spectrum, the path loss may then be used to determine a power (transmitted from the CBSD) at a geographic location (e.g., at another CBSD or a protection point) remote from the CBSD. Optionally, the PMS 102A-3 includes two or more propagation models one of which may be selected based upon geographic morphology (e.g., topography) between two geographic points. The propagation model(s) may include a free space path loss model, an irregular terrain model and/or a Hata model (or variation(s) thereof such as the extended Hata (eHata) model). The PMS 102A-3 may be utilized by the SC 102A-1 to determine interference power transmitted from a CBSD at a geographic location remote from the CBSD.

The SC 102A-1 also includes techniques for generating a neighborhood around each protection point, and can utilize the PMS 102A-3 to determine the aggregate level of interference, at each protection point, in frequency spectra from CBSD(s) in the neighborhood of the protection point. To this end, the propagation model(s) (e.g., free space path loss model, irregular terrain model and/or Hata model (or variations thereof such as the extended Hata (eHata) model)) are used to determine path loss between CBSDs and protection point(s).

The SAS database 102A-2 includes information about the CBSD(s) 108 and CBSDs (geographically proximate to the CBSD(s) 108) whose transmissions in some or all of the shared spectrum are controlled by other SAS(s) 106. Optionally, such CBSD information may include CBSD type (and thus maximum transmit power) and/or maximum transmit power, geographic location, antenna height, antenna gain, antenna pattern, antenna down tilt angle, and/or antenna azimuthal angle. The SAS database 102A-2 also includes information about the location, e.g., representative protection point(s), of incumbent users proximate to the CBSD(s) 108. Additionally, and/or alternatively, the SAS 102 may remotely obtain such information, e.g., form the central database(s) 109, the other SAS(s) 106 (e.g., from a full activity dump (FAD) from each of the other SAS(s) 106 to the SAS 102), and/or the corresponding CBSD(s). The SAS database 102A-2 also includes a network graph generated by execution of the SC 102A-1. The network graph comprises one or more nodes, where each node comprises one or more CBSDs, and each node is assigned a color. The SAS database 102A-2 may also include frequency spectrum allocation information for each color of each node of the network graph generated by SC 102A-1. Optionally, the SAS database 102A-2 may include geographic morphology data about the geographic region where CBSDs whose transmission is controlled by the SAS 102 and optionally by other SAS(s) 106.

Figure 2A:
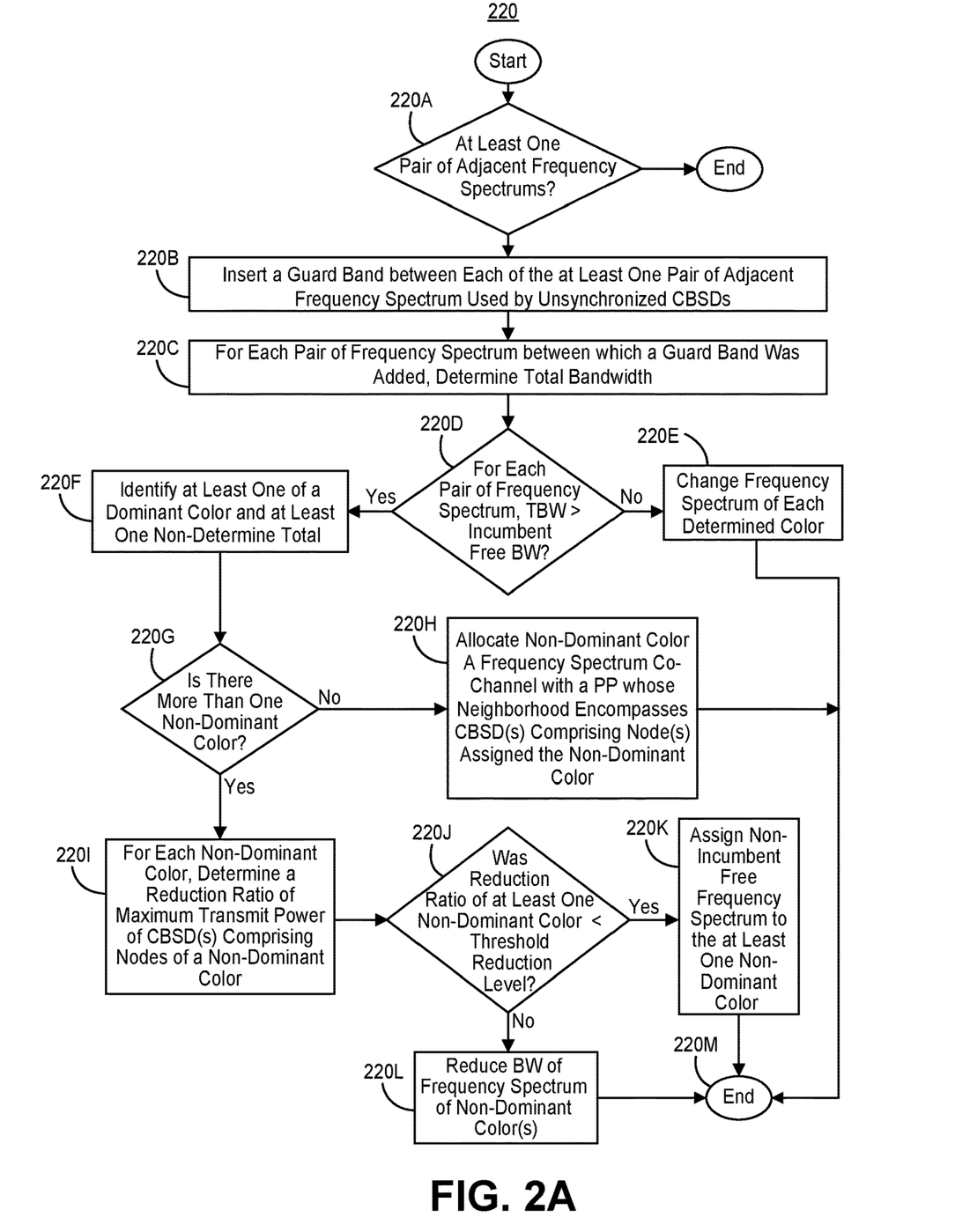
FIG. 2A illustrates a flow diagram of one embodiment of a method of inserting a guard band between adjacent frequency spectrums.

FIG. 2A illustrates a flow diagram of one embodiment of a method 220 of inserting a guard band between adjacent frequency spectrums. To the extent that the methods shown in any of the Figures is described herein as being implemented in the system shown in FIG. 1, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner). Optionally, methods described herein may be performed by the SAS or other processing systems.

In block 220A, whether there is at least one pair of adjacent frequency spectrums is determined. Each pair of the adjacent frequency spectrums comprises two frequency spectrum which are adjacent and each of which is allocated to a unique color assigned to one node of a pair of nodes of a network graph, wherein the pair of adjacent frequency spectrums do not overlap and wherein one end of one frequency spectrum of the pair of adjacent frequency spectrums is within a predefined threshold frequency of another end of the other frequency spectrum of the pair of adjacent frequency spectrums, wherein each radio comprising one node of the pair of nodes is time domain duplexing unsynchronized with each radio comprising the other node of the pair of nodes.

In block 220B, for at least one pair of nodes connected by an edge in the network graph, where each pair of nodes comprises one node and another node, where the one node and the other node are assigned colors which are assigned a different frequency spectrum that are adjacent, and where the CBSDs comprising the one node and the other node are TDD unsynchronized, a guard band is inserted between each of the at least one pair of frequency spectrum that are adjacent and each of which is assigned to a unique color; as a result, one end of one frequency spectrum of the pair of adjacent frequency spectrums is no longer within the predefined threshold frequency of another end of the other frequency spectrum of the pair of adjacent frequency spectrums. Inserting a guard band with respect to block 220B means shifting a center frequency of and maintaining a bandwidth of each frequency spectrum of each pair of the at least one pair of frequency spectrums that are adjacent and each of which is assigned to a unique color. The at least pair of nodes may be all such connected nodes, or a subset thereof as is further discussed with respect to FIG. 3. Optionally, each such pair of frequency spectrums that are adjacent is first identified. Optionally, prior to inserting the guard band, whether there are adjacent frequency spectrums for at least one pair of nodes connected by an edge in the network graph is determined, where each CBSD comprising one node of a pair of nodes is time domain duplexing unsynchronized with each CBSD comprising the other node of the pair.

In block 220B, for each pair(s) of nodes having an edge and adjacent frequency spectrum for each identified connected set, a guard band is added between each of the adjacent frequency spectrums. Optionally, each guard band has fixed bandwidth, e.g., 2.5 MHz, but a different bandwidth may be used. Alternatively, a guard band bandwidth for each pair of nodes sharing an edge, which utilize adjacent spectrum, and are TDD unsynchronized may depend upon an indicia of aggregate adjacent channel interference, e.g., a total number of CBSDs in the pair of nodes and/or an aggregate power level of adjacent channel interference from CBSDs comprising one node at one CBSD comprising the other node or a centroid of more than one CBSD comprising the other node. Blocks 220C through 220L are optional.

In block 220C, a total bandwidth (TBW), for each pair of frequency spectrum (of each relevant connected set) between which a guard band was inserted, is determined. Total bandwidth means a sum of: (a) a bandwidth of each frequency spectrum (between which the guard band is inserted) and (b) a bandwidth of the guard band.

In block 220D, whether the total bandwidth, of each pair of frequency spectrum (between which a guard band was inserted) and a corresponding guard band (of each relevant connected set), is greater than an incumbent free bandwidth is determined. Incumbent free bandwidth means (a) frequency spectrum (in shared frequency spectrum in which CBSDs comprising the one node and the other node are permitted to transmit) not associated with each protection point whose neighborhood encompass the geographic location of one or more CBSDs of the one node and/or the other node and (b) frequency spectrum associated with each protection point (whose neighborhood encompass the geographic location of one or more CBSDs of the one node and/or the other node) where an aggregate interference level at the protection point is below a corresponding interference threshold level. The interference threshold level can vary based upon a type of protection point. Frequency spectrum, or each portion thereof, associated with a protection point means frequency spectrum that must be free of interference (as that term is elsewhere defined herein) at the geographic location of the protection point; optionally, such frequency spectrum corresponds to frequency spectrum utilized by a receiver of an incumbent user or a PAL CBSD.

For each pair of frequency spectrum that were adjacent and where the total bandwidth is determined to be not greater than the incumbent free bandwidth, then, in block 220E, the frequency spectrum is changed for each color assigned to each node of each corresponding pair nodes. The frequency spectrum of each color is adjusted, e.g., shifted, to accommodate the insertion of the guard band between the frequency spectrum of each color. Optionally, the changed frequency spectrum of each color is sent, e.g., by SAS(s) (controlling the CBSD(Ss)), for example, in a grant request response or a spectrum inquiry response, to the CBSD(s) comprising node(s) assigned each of the two colors; thus, the frequency spectrum of corresponding receiving CBSD(s) may then be changed to the corresponding received changed frequency spectrum. The aforementioned sending of changed frequency spectrum to CBSD(s) and changing the frequency spectrum of the receiving CBSD(s) may also be optionally performed for each of blocks 220H, 220K, and 220L.

For each pair of frequency spectrum that were adjacent and where the total bandwidth is determined to be greater than the incumbent free bandwidth, then, in block 220F, at least one of a dominant color and at least one non-dominant color in a corresponding connected set is identified. Dominant color means a color allocated to at least one node, of a connected set comprising at least one of the pair of nodes, comprising at least one radio, wherein a percentage of CBSD(s) comprising the at least one node of the color of a connected set with respect to a total number of CBSD(s) comprising all nodes of the connected set that is greater than a threshold percentage. A non-dominant color is a color that is not dominant. The threshold percentage may be fifty percent or another percentage. Optionally, block 220F may be implemented by determining whether there is a dominant color, and then identifying non-dominant colors; if it is determined that there is a dominant color, the dominant color is identified.

For each connected set comprising at least node of the at least one pair of nodes connected by an edge and assigned colors assigned frequencies that were adjacent, in block 220G, whether there is more than one non-dominant color (assigned to nodes of a connected set) is determined. For each such connected set where there is only one non-dominant color, i.e., no more than one dominant color, (assigned to node(s) of a connected set), in block 220H, the non-dominant color is allocated a frequency spectrum co-channel with frequency spectrum associated with a protection point whose neighborhood encompasses CBSD(s) comprising the at least one node assigned the color.

For each such connected set comprising nodes allocated more than one non-dominant color, in block 220I, for each node (allocated a non-dominant color) of such a connected set, a reduction ratio of maximum transmit power of CBSD(s) comprising nodes of each non-dominant color is determined. Optionally, each reduction ratio is in decibel units. Optionally, the reduction ratio is determined by allocating power reduction to CBSDs in a neighborhood of a protection point so that aggregate interference at the protection point does not exceed a corresponding interference threshold level for the protection point. Optionally, allocation of power reduction may be implemented using the iterative allocation process. Optionally, the reduction ratio is an average or a median of a ratio of power reduction of each CBSD comprising nodes of each non-dominant colors; however, alternatively other statistical measures can be used, e.g., an average and a standard deviation.

For each such connected set with more than one non-dominant color, in block 220J, whether a reduction ratio of at least one non-dominant color of such a connected set is less than a reduction threshold level is determined, where the frequency spectrum assigned to the non-dominant colors with a reduction ratio less than the threshold reduction level is at least a sum of guard bands inserted between adjacent frequency spectrum assigned to colors of nodes of the connected set. If the reduction ratio of at least one nondominant color of such a connected set is less than a reduction threshold level (where the frequency spectrum assigned to the non-dominant colors with a reduction ratio less than the threshold reduction level is at least a sum of guard bands inserted between adjacent frequency spectrums assigned to colors of nodes of the connected set), then, in block 220K, non-incumbent free frequency spectrum is assigned to the non-dominant colors (whose reduction ratio is below the threshold reduction level). If more than one set of at least one non-dominant color can be assigned non-incumbent free frequency spectrum to achieve such a reduction, then a set of at least one non-dominant color may be chosen based upon an indicia of reduction ratio or chosen arbitrarily; if a set of at least one non-dominant color is to be chosen based upon the indicia of reduction ratio, then a set of at least one non-dominant color may be chosen having a lowest average reduction ratio based upon the reduction ratio of all non-dominant colors in the set. Optionally, any remaining non-dominant colors not assigned frequency spectrum in non-incumbent free spectrum are assigned frequency spectrum in the incumbent free spectrum, and the dominant color is assigned frequency spectrum in the incumbent free spectrum.

If the reduction ratio of at least one nondominant color of such a connected set is not less than a reduction threshold level (where the frequency spectrum assigned to the non-dominant colors with a reduction ratio less than the threshold reduction level is at least a sum of guard bands inserted between adjacent frequency spectrums assigned to colors of nodes of the connected set), then, in block 220L, a bandwidth of each frequency spectrum assigned to at least one non-dominant color (and optionally the dominant color) is reduced so that a total bandwidth of the frequency spectrum and any added guard bands is not greater than the incumbent free spectrum. Optionally, bandwidth reduction may be asymmetric for frequency spectrum assigned to dominant and non-dominant colors; optionally, bandwidth reduction for frequency spectrum assigned to non-dominant colors may be greater than bandwidth reduction for frequency spectrum assigned to dominant colors. Optionally, bandwidth of frequency spectrum of only non-dominant color(s) is reduced, and bandwidth of frequency spectrum of a dominant color is not reduced. Optionally, if there is insufficient bandwidth (e.g., bandwidth for frequency spectrum for each non-dominant color is below a threshold bandwidth, e.g., 5 MHz) for non-dominant colors, then transmit power(s) of CBSD(s) comprising the non-dominant color node(s) are determined so that interference from the CBSD(s) comprising the non-dominant color node(s) at each node with which such non-dominant color node(s) forms an edge is below a corresponding interference threshold level so that the edge(s) are eliminated between the non-dominant color node(s) and each node with which the non-dominant color node(s) had formed an edge; however, the transmit power may not be reduced so that one or more dimensions (e.g., a radius) defining a coverage area (having a predefined minimum power level at an edge of the coverage area) of a CBSD is reduced below a corresponding dimension threshold level. Optionally, this can be accomplished by using the propagation modelling techniques described herein and iteratively reducing the transmit power of the CBSD(s) comprising each non-dominant node until no edge is formed between the non-dominant color node and another node, while enhancing, e.g., optimizing, the transmit power of the CBSD(s) comprising the non-dominant color node. Optionally, in lieu of the foregoing or if an edge between a non-dominant color node and another node cannot be eliminated, then a message may be sent to CBSD(s) comprising nodes assigned non-dominant color(s) directing the CBSD(s) to cease transmission, which is effectively assigning such CBSD(s) a zero maximum transmission power level.

Figure 2B:
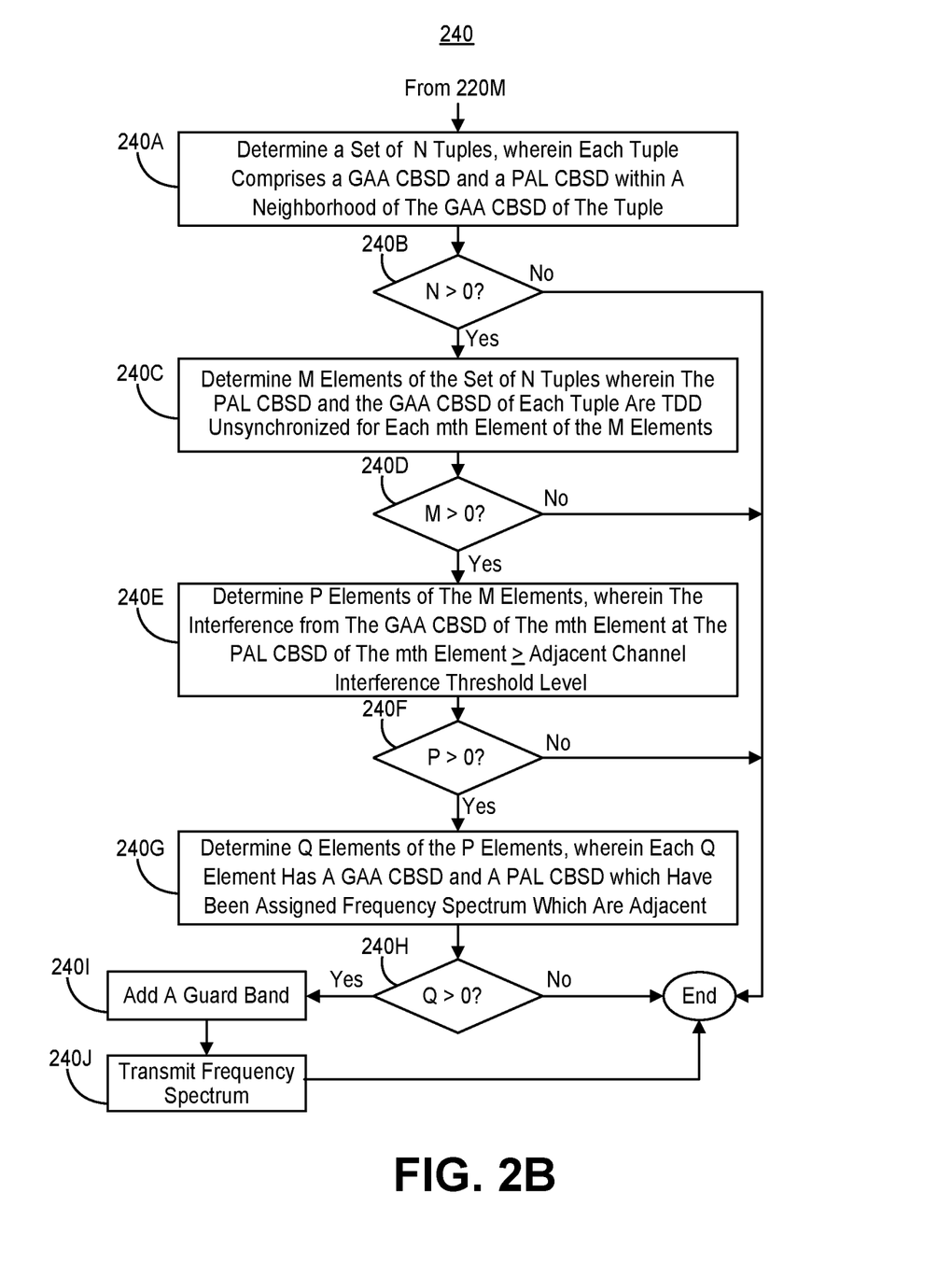
FIG. 2B illustrates a flow diagram of one embodiment of an optional method of determining whether a guard band needs to be inserted between assigned frequency spectrums of a GAA CBSD and a PAL CBSD.

FIG. 2B illustrates a flow diagram of one embodiment of an optional method 240 of determining whether a guard band needs to be inserted between assigned frequency spectrums, e.g., transmission frequency spectrum, of a GAA CBSD and a PAL CBSD. The GAA CBSD and the PAL CBSD are TDD unsynchronized. A PAL CBSD may have a GAA CBSD assigned frequency spectrum adjacent (above and/or below) to the frequency spectrum, e.g., transmission frequency spectrum, of the PAL CBSD. Therefore, whether a GAA CBSD (assigned frequency spectrum adjacent (above and/or below) to the frequency spectrum, e.g., transmission frequency spectrum, of the PAL CBSD) generates interference (e.g., a power level) at the PAL CBSD exceeding an interference power threshold level may be determined. If the interference exceeds the interference power threshold level for such PAL and GAA CBSDs, then a guard band is created between the frequency spectrum, e.g., transmission frequency spectrum, of each of the PAL CBSD and the GAA CBSD to reduce adjacent channel interference by the GAA CBSD to the PAL CBSD. The guard band is created by reducing the frequency spectrum, e.g., transmission frequency spectrum, of the GAA CBSD. Optional method 240 is performed after block 220B, e.g., after blocks 220E, 220H, 220K and/or 220L (illustrated in FIG. 2A as block 220M) of method 220.

In block 240A, a set of N tuples is determined. The tuple may be ordered or unordered. Unordered tuple means a set of at least two elements with no particular order and comprises a GAA CBSD and a PAL CBSD, wherein the PAL CBSD of a tuple within a neighborhood of the GAA CBSD of the tuple. Optionally, the neighborhood of a GAA CBSD is circular and has a radius of 40 km. N is an integer greater than or equal to zero.

In block 240B, whether N is greater than zero is determined. If N is determined to be greater than zero, then, in block 240C, M elements of the set of N tuples are determined, wherein the PAL CBSD and the GAA CBSD of each tuple are TDD unsynchronized for each mth element of the M elements. M is an integer greater than or equal to zero.

In block 240D, whether M is greater than zero is determined. If M is determined to be greater than zero, then, in block 240E, P elements of the M elements are determined, wherein the interference, e.g., in assigned frequency spectrum, from the GAA CBSD of the mth element at the geographic location of the PAL CBSD of the mth element is greater than or equal to an adjacent channel interference threshold level. Block 240E may be performed using conventional path loss modeling between geographic locations of the GAA CBSD and the PAL CBSD, and using a maximum transmit power either assigned, e.g., by a SAS, to the GAA CBSD or based upon a rating, e.g., class, of the GAA CBSD. P is an integer greater than or equal to zero. The interference and the adjacent channel interference threshold level are both power levels of the same type, e.g., power or power spectral density.

In block 240F, whether P is greater than zero is determined. If P is determined to be greater than zero, then, in block 240G, Q elements, of the P elements, are determined, wherein each Q element has a GAA CBSD and a PAL CBSD which have been assigned frequency spectrum, e.g., transmission frequency spectrum, which are adjacent.

In block 240H, whether Q is greater than zero is determined. If Q is greater than zero, then add a guard band between the assigned frequency spectrum, e.g., transmission frequency spectrum, of the GAA CBSD and the PAL CBSD of each Q element. Each guard band is formed by diminishing the bandwidth of the frequency spectrum, e.g., transmission frequency spectrum, assigned to the GAA CBSD of each Q element.

If Q is greater than zero, then, in block 240I, a guard band is added between frequency spectrum of the GAA CBSD and the assigned frequency spectrum of the PAL CBSD of each Q element. Optionally, each guard band is formed by diminishing the bandwidth of the frequency spectrum assigned to the GAA CBSD of each Q element or by shifting the frequency spectrum of the GAA CBSD. Optionally, each guard band has fixed bandwidth, e.g., 2.5 MHz, but a different bandwidth may be used. In block 240J, a corresponding frequency spectrum with diminished bandwidth is transmitted to the GAA CBSD, of each Q element, which is configured to transmit in the corresponding frequency spectrum with diminished bandwidth. The different guard bands described in FIGS. 2A, 2B, and 3 may or may not have different bandwidths.

Figure 3:
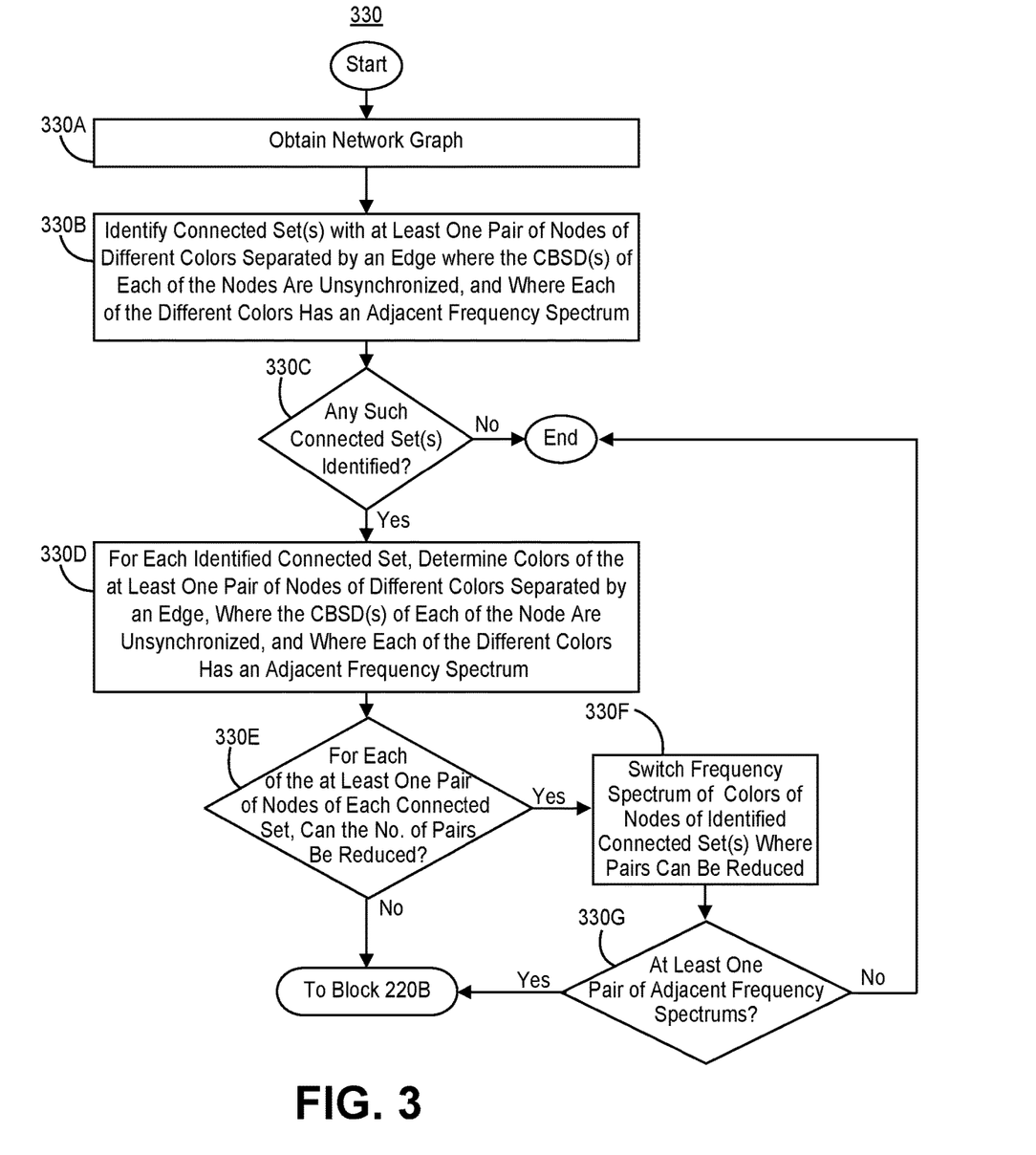
FIG. 3 illustrates a flow diagram of one embodiment of a method for determining whether there are at least one pair of adjacent frequency spectrums.

FIG. 3 illustrates a flow diagram of one embodiment of a method 330 of determining whether there are at least one pair of adjacent frequency spectrums, i.e., implementing block 220A of FIG. 2A. Optionally, in block 330A, a network graph is obtained, e.g., from a SAS database. In block 330B, connected set(s) of the network graph with at least one pair of nodes of different colors connected by an edge are identified, where CBSD(s) of each of the nodes are TDD unsynchronized, and where each of the different colors has an adjacent frequency spectrum. The network graph identifies the colors assigned to each node. The frequency spectrum assigned to each color and information related to air interface and TDD synchronization configuration type may be retrieved elsewhere, e.g., from the SAS database. Optionally, the information related to air interface and TDD synchronization configuration type is provided by CBSD(s) when registering with a SAS.

Optionally, in block 330C, whether any such connected sets (described in block B) were identified is determined. Only if such connected sets were identified, proceed to block 330D.

in block 330D, for each identified connected set, colors of the at least one pair of nodes of different colors separated by an edge are determined, where the CBSD(s) of each of the node are TDD unsynchronized, and where each of the different colors has an adjacent frequency spectrum assigned to it. Optionally, in block 330E, for each of the at least one pair of nodes of each connected set, whether the number of pairs can be reduced is determined. Optionally, this entails determining whether one node has an edge with, includes CBSD(s) TDD unsynchronized with, and has adjacent frequency spectrum with two other nodes, where the three nodes have different colors. Thus, the frequency spectrum assigned to the one node must be located between the frequency spectrum of the other two nodes. If the number of pairs of nodes can be reduced, then proceed to optional block 330F.

In optional block 330F, the frequency spectrum assigned to the color of one of the other two nodes is switched with the frequency spectrum assigned to the color of the one node. Thus, the frequency spectrum of the color assigned to the one node is now only adjacent to the frequency spectrum of the color assigned one of the other two nodes. As a result, the number of nodes having edges and adjacent frequency spectrum in the connected set is diminished. If optional block 330F is used, then after performing block 330F proceed to block 330G. In block 330G, whether there is at least one pair of adjacent frequency spectrums is determined (as discussed above with respect to block 220A). If it is determined that there is at least one pair of adjacent frequency spectrums, then proceed to block 220B. Further, optionally, after block 330D (if optional blocks 330E and 330F are not used) or optional block 330E (for each of the at least one pair of nodes of each connected set, whether the number of pairs cannot be reduced is determined), proceed to block 220B. If it is determined (in block 330G) that there is not at least one pair of adjacent frequency spectrums, then do not proceed further, e.g., to block 220B.

The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

Databases as used herein may be either conventional databases or data storage formats of any type, e.g., data files. Although separate databases are recited herein, one or more of such databases may be combined.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

The invention claimed is:

1. A program product comprising a non-transitory processor readable medium on which program instructions are embodied, wherein the program instructions are configured, when executed by at least one programmable processor, to cause the at least one programmable processor to:

determine whether there is at least one pair of adjacent frequency spectrums, wherein each pair of the adjacent frequency spectrums comprises two frequency spectrums which are adjacent and each of which is allocated to a unique color assigned to one node of a pair of nodes of a network graph, wherein a pair of adjacent frequency spectrums do not overlap and wherein one end of one frequency spectrum of the pair of adjacent frequency spectrum is within a predefined threshold frequency of another end of another frequency spectrum of the pair of adjacent frequency spectrums, wherein an edge is formed between each node of the pair of nodes, wherein each general authorized access (GAA) radio, of one node of the pair of nodes, is time domain duplexing (TDD) unsynchronized with each GAA radio of another node of the pair of nodes, and wherein the edge is a criterion of interference at a GAA radio or at a node exceeds a first interference threshold level;

determine that there is the at least one pair of adjacent frequency spectrums, then insert a first guard band between each frequency spectrum of each pair of adjacent frequency spectrums so that the one end of one frequency spectrum of the pair of adjacent frequency spectrum is no longer within the predefined threshold frequency of another end of another frequency spectrum of the pair of adjacent frequency spectrums;

wherein the pair of adjacent frequency is within a shared frequency spectra; and either:

(a) for each pair of frequency spectrum between which the first guard band was inserted, determine a total bandwidth which is a sum of a bandwidth of each of the frequency spectrum, between which the first guard band is inserted, and a bandwidth of the first guard band;

for each pair of adjacent frequency spectrums between which the first guard band was inserted, determine if the total bandwidth is greater than an incumbent free bandwidth, wherein the incumbent free bandwidth is (i) a frequency spectrum not associated with each protection point whose neighborhood encompasses a geographic location of at least one GAA radio of at least one of the one node and the other node and (ii) a frequency spectrum associated with each such protection point and wherein an aggregate interference level at a protection point, associated with the frequency spectrum, is below a corresponding second interference threshold level, wherein frequency spectrum associated with a protection point means a frequency spectrum that must be free of interference at the geographic location of the protection point associated with the frequency spectrum, and wherein free of interference is a level of interference below the corresponding second interference threshold level; and determine that the total bandwidth is not greater than the incumbent free bandwidth for at least one pair of frequency spectrum between which the first guard band was inserted, then for each such pair of frequency spectrum change the frequency spectrum, for each color assigned to each node of each corresponding pair nodes, to account for the inserted first guard band; or (b) determine a set of N tuples, wherein each tuple comprises a GAA radio and a priority access license (PAL) radio within a neighborhood of the GAA radio of a tuple, wherein N is an integer greater than or equal to zero;

determine if the N is greater than zero;

determine that the N is greater than zero, then determine M elements of the set of N tuples, wherein the PAL radio and the GAA radio of each tuple are time domain duplexing unsynchronized for each mth element of the M elements, and wherein M is an integer greater than or equal to zero;

determine if the M is greater than zero;

determine that the M is greater than zero, then determine P elements of the M elements, wherein the interference from the GAA radio of an mth element at a geographic location of the PAL radio of the mth element greater than or equal to an adjacent channel interference threshold level, and wherein P is an integer greater than or equal to zero;

determine if the P is greater than zero;

determine that the P is greater than zero, then determine Q elements of the P elements, wherein each Q element has a GAA radio and a PAL radio which have been assigned frequency spectrum that are adjacent, and wherein Q is an integer greater than or equal to zero;

determine if the Q is greater than or equal to zero;

determine that the Q is greater than or equal to zero, then add a second guard band between frequency spectrum of the GAA radio and the assigned frequency spectrum of the PAL radio of each Q element, wherein the second guard band is formed by diminishing a bandwidth of the frequency spectrum assigned to the GAA radio of each Q element; and transmit a corresponding frequency spectrum with a diminished bandwidth to the GAA radio, of each Q element, which is configured to transmit in the corresponding frequency spectrum with the diminished bandwidth.

2. The program product of claim 1, wherein each GAA radio comprises a citizens broadband radio service device.

3. The program product of claim 1, wherein the program instructions are further configured, when executed by the at least one programmable processor, to further cause the at least one programmable processor to:

change a frequency spectrum allocated to the unique color of at least one node of a pair of nodes; and send the changed frequency spectrum to each GAA radio comprising the at least one node, wherein each such GAA radio is configured, upon receipt of the changed frequency spectrum, to then transmit in the changed frequency spectrum.

4. The program product of claim 1, wherein the program instructions are further configured, when executed by the at least one programmable processor, to further cause the at least one programmable processor upon performing (a) to:
    determine that the total bandwidth is greater than the incumbent free bandwidth for at least one pair of frequency spectrum between which the first guard band was inserted, then for each pair identify at least one of a dominant color and at least one non-dominant color, wherein the dominant color is a color allocated to at least one node, of a connected set comprising at least one of a corresponding pair of nodes, comprising at least one GAA radio, wherein a percentage of the at least one GAA radio in the at least one node of the color of the connected set with respect to at least one GAA radio comprising each node of the connected set exceeds a threshold percentage;
    for each connected set comprising at least one node of a pair of nodes, determine whether there is more than one non-dominant color assigned to nodes of a connected set;
    determine that there is only one non-dominant color assigned to at least one node of the connected set, then allocate the only one non-dominant color a frequency spectrum co-channel with frequency spectrum associated with a protection point whose neighborhood encompasses at least one GAA radio comprising the at least one node, of the connected set, assigned to the only one non-dominant color, wherein co-channel means same as or a subset of;
    determine that there is more than one non-dominant color assigned to nodes of a connected set, then for each non-dominant color of the connected set, determine a reduction ratio of a maximum transmit power of each GAA radio comprising the nodes, of the connected set, assigned a non-dominant color;
    determine whether the reduction ratio of at least one non-dominant color is less than a reduction threshold level;
    determine that the reduction ratio of at least one non-dominant color is less than the reduction threshold level, then assign non-incumbent free frequency spectrum to each non-dominant color which has a reduction ratio below the reduction threshold level; and
    determine that the reduction ratio of none of non-dominant colors are less than the reduction threshold level, then either reduce a bandwidth of each frequency spectrum assigned to at least one non-dominant color or diminish a maximum transmit power level assigned to GAA radios comprising each node assigned the at least one non-dominant color.

5. The program product of claim 1, wherein determine whether there is at least one pair of adjacent frequency spectrums comprises:
    obtain the network graph;
    identify at least one connected set, in the network graph, comprising at least one pair of nodes of different colors connected by an edge, where the one node of the pair comprises at least one GAA radio that is TDD unsynchronized with at least one GAA radio comprising the other node of the pair, wherein each of the different colors is assigned one of the pair of adjacent frequency spectrums;
    identify at least one connected set of the network graph with at least one pair of nodes of different colors connected by an edge; and
    for each identified connected set, determine colors of the at least one pair of nodes of different colors separated by an edge.

6. A method, comprising:
    determining whether there is at least one pair of adjacent frequency spectrums, wherein each pair of the adjacent frequency spectrums comprises two frequency spectrums which are adjacent and each of which is allocated to a unique color assigned to one node of a pair of nodes of a network graph, wherein a pair of adjacent frequency spectrums do not overlap and wherein one end of one frequency spectrum of the pair of adjacent frequency spectrum is within a predefined threshold frequency of another end of another frequency spectrum of the pair of adjacent frequency spectrums, wherein an edge is formed between each node of the pair of nodes, wherein each general authorized access (GAA) radio, of one node of the pair of nodes, is time domain duplexing (TDD) unsynchronized with each GAA radio of another node of the pair of nodes, and wherein the edge is a criterion of interference at a GAA radio or at a node exceeds a first interference threshold level;
    determining that there is the at least one pair of adjacent frequency spectrums, then inserting a first guard band between each frequency spectrum of each pair of adjacent frequency spectrums so that the one end of one frequency spectrum of the pair of adjacent frequency spectrum is no longer within the predefined threshold frequency of another end of another frequency spectrum of the pair of adjacent frequency spectrums;
    wherein the pair of adjacent frequency is within a shared frequency spectra; and
    either:
    (a) for each pair of frequency spectrum between which the first guard band was inserted, determining a total bandwidth which is a sum of a bandwidth of each of the frequency spectrum, between which the first guard band is inserted, and a bandwidth of the first guard band;
    for each pair of adjacent frequency spectrums between which the first guard band was inserted, determining if the total bandwidth is greater than an incumbent free bandwidth, wherein the incumbent free bandwidth is (i) a frequency spectrum not associated with each protection point whose neighborhood encompasses a geographic location of at least one GAA radio of at least one of the one node and the other node and (ii) a frequency spectrum associated with each such protection point and wherein an aggregate interference level at a protection point, associated with the frequency spectrum, is below a corresponding second interference threshold level, wherein frequency spectrum associated with a protection point means a frequency spectrum that must be free of interference at the geographic location of the protection point associated with the frequency spectrum, and wherein free of interference is a level of interference below the corresponding second interference threshold level; and
    determining that the total bandwidth is not greater than the incumbent free bandwidth for at least one pair of frequency spectrum between which the first guard band was inserted, then for each such pair of frequency spectrum changing the frequency spectrum, for each color assigned to each node of each corresponding pair nodes, to account for the inserted first guard band; or (b) determining a set of N tuples, wherein each tuple comprises a GAA radio and a priority access license (PAL) radio within a neighborhood of the GAA radio of a tuple, wherein N is an integer greater than or equal to zero;

determining if the N is greater than zero;

determining that the N is greater than zero, then determining M elements of the set of N tuples, wherein the PAL radio and the GAA radio of each tuple are time domain duplexing unsynchronized for each mth element of the M elements, and wherein M is an integer greater than or equal to zero;

determining if the M is greater than zero;

determining that the M is greater than zero, then determining P elements of the M elements, wherein the interference from the GAA radio of an mth element at a geographic location of the PAL radio of the mth element greater than or equal to an adjacent channel interference threshold level, and wherein P is an integer greater than or equal to zero;

determining if the P is greater than zero;

determining that the P is greater than zero, then determining Q elements of the P elements, wherein each Q element has a GAA radio and a PAL radio which have been assigned frequency spectrum that are adjacent, and wherein Q is an integer greater than or equal to zero;

determining if the Q is greater than or equal to zero;

determining that the Q is greater than or equal to zero, then adding a second guard band between frequency spectrum of the GAA radio and the assigned frequency spectrum of the PAL radio of each Q element, wherein the second guard band is formed by diminishing a bandwidth of the frequency spectrum assigned to the GAA radio of each Q element; and transmitting a corresponding frequency spectrum with a diminished bandwidth to the GAA radio, of each Q element, which is configured to transmit in the corresponding frequency spectrum with the diminished bandwidth.

7. The method of claim 6, wherein each GAA radio comprises a citizens broadband radio service device.

8. The method of claim 6, further comprising:

changing a frequency spectrum allocated to the unique color of at least one node of a pair of nodes; and transmitting the changed frequency spectrum to each GAA radio comprising the at least one node, wherein each such GAA radio is configured, upon receipt of the changed frequency spectrum, to then transmit in the changed frequency spectrum.

9. The method of claim 6, further comprising:

upon performing (a), then:

determining that the total bandwidth is greater than the incumbent free bandwidth for at least one pair of frequency spectrum between which the first guard band was inserted, then for each pair identifying at least one of a dominant color and at least one non-dominant color, wherein the dominant color is a color allocated to at least one node, of a connected set comprising at least one of a corresponding pair of nodes, comprising at least one GAA radio, wherein a percentage of the at least one GAA radio in the at least one node of the color of the connected set with respect to at least one GAA radio comprising each node of the connected set exceeds a threshold percentage;

for each connected set comprising at least one node of a pair of nodes, determining whether there is more than one non-dominant color assigned to nodes of a connected set;

determining that there is only one non-dominant color assigned to at least one node of the connected set, then allocating the only one non-dominant color a frequency spectrum co-channel with frequency spectrum associated with a protection point whose neighborhood encompasses at least one GAA radio comprising the at least one node, of the connected set, assigned to the only one non-dominant color, wherein co-channel means same as or a subset of;

determining that there is more than one non-dominant color assigned to nodes of a connected set, then for each non-dominant color of the connected set, determining a reduction ratio of a maximum transmit power of each GAA radio comprising the nodes, of the connected set, assigned a non-dominant color;

determining whether the reduction ratio of at least one non-dominant color is less than a reduction threshold level;

determining that the reduction ratio of at least one non-dominant color is less than the reduction threshold level, then assigning non-incumbent free frequency spectrum to each non-dominant color which has a reduction ratio below the reduction threshold level; and determining that the reduction ratio of none of non-dominant colors are less than the reduction threshold level, then either reducing a bandwidth of each frequency spectrum assigned to at least one non-dominant color or diminishing a maximum transmit power level assigned to GAA radios comprising each node assigned the at least one non-dominant color.

10. The method of claim 6, wherein determine whether there is at least one pair of adjacent frequency spectrums comprises:

obtaining the network graph;

identifying at least one connected set, in the network graph, comprising at least one pair of nodes of different colors connected by an edge, where the one node of the pair comprises at least one GAA radio that is TDD unsynchronized with at least one GAA radio comprising the other node of the pair, wherein each of the different colors is assigned one of the pair of adjacent frequency spectrums;

identifying at least one connected set of the network graph with at least one pair of nodes of different colors connected by an edge; and for each identified connected set, determining colors of the at least one pair of nodes of different colors separated by an edge.

11. An apparatus comprising:

a processing circuitry comprising processor circuitry coupled to memory circuitry, wherein the processing circuitry is configured to:

determine whether there is at least one pair of adjacent frequency spectrums, wherein each pair of the adjacent frequency spectrums comprises two frequency spectrums which are adjacent and each of which is allocated to a unique color assigned to one node of a pair of nodes of a network graph, wherein a pair of adjacent frequency spectrums do not overlap and wherein one end of one frequency spectrum of the pair of adjacent frequency spectrum is within a predefined threshold frequency of another end of another frequency spectrum of the pair of adjacent frequency spectrums, wherein an edge is formed between each node of the pair of nodes, wherein each general authorized access (GAA) radio of one node of the pair of nodes is time domain duplexing (TDD) unsynchronized with each GAA radio of another node of the pair of nodes, and wherein the edge is a criterion of interference at a GAA radio or at a node exceeds a first interference threshold level; and determine that there is the at least one pair of adjacent frequency spectrums, then insert a first guard band between each frequency spectrum of each pair of adjacent frequency spectrums so that the one end of one frequency spectrum of the pair of adjacent frequency spectrum is no longer within the predefined threshold frequency of another end of another frequency spectrum of the pair of adjacent frequency spectrums;

wherein the pair of adjacent frequency is within a shared frequency spectra; and either:
(a) for each pair of frequency spectrum between which the first guard band was inserted, determine a total bandwidth which is a sum of a bandwidth of each of the frequency spectrum, between which the first guard band is inserted, and a bandwidth of the first guard band;

for each pair of adjacent frequency spectrums between which the first guard band was inserted, determine if the total bandwidth is greater than an incumbent free bandwidth, wherein the incumbent free bandwidth is (i) a frequency spectrum not associated with each protection point whose neighborhood encompasses a geographic location of at least one GAA radio of at least one of the one node and the other node and (ii) a frequency spectrum associated with each such protection point and wherein an aggregate interference level at a protection point, associated with the frequency spectrum, is below a corresponding second interference threshold level, wherein frequency spectrum associated with a protection point means a frequency spectrum that must be free of interference at the geographic location of the protection point associated with the frequency spectrum, and wherein free of interference is a level of interference below the corresponding second interference threshold level; and determine that the total bandwidth is not greater than the incumbent free bandwidth for at least one pair of frequency spectrum between which the first guard band was inserted, then for each such pair of frequency spectrum change the frequency spectrum, for each color assigned to each node of each corresponding pair nodes, to account for the inserted first guard band; or (b) determine a set of N tuples, wherein each tuple comprises a GAA radio and a priority access license (PAL) radio within a neighborhood of the GAA radio of a tuple, wherein N is an integer greater than or equal to zero;

determine if the N is greater than zero;

determine that the N is greater than zero, then determine M elements of the set of N tuples, wherein the PAL radio and the GAA radio of each tuple are time domain duplexing unsynchronized for each mth element of the M elements, and wherein the M is an integer greater than or equal to zero;

determine if the M is greater than zero;

determine that the M is greater than zero, then determine P elements of the M elements, wherein the interference from the GAA radio of an mth element at a geographic location of the PAL radio of the mth element greater than or equal to an adjacent channel interference threshold level, and wherein P is an integer greater than or equal to zero;

determine if the P is greater than zero;

determine that the P is greater than zero, then determine Q elements of the P elements, wherein each Q element has a GAA radio and a PAL radio which have been assigned frequency spectrum that are adjacent, and wherein Q is an integer greater than or equal to zero;

determine if the Q is greater than or equal to zero;

determine that the Q is greater than or equal to zero, then add a second guard band between frequency spectrum of the GAA radio and the assigned frequency spectrum of the PAL radio of each Q element, wherein the second guard band is formed by diminishing a bandwidth of the frequency spectrum assigned to the GAA radio of each Q element; and transmit a corresponding frequency spectrum with a diminished bandwidth to the GAA radio, of each Q element, which is configured to transmit in the corresponding frequency spectrum with the diminished bandwidth.

12. The apparatus of claim 11, wherein each GAA radio comprises a citizens broadband radio service device.

13. The apparatus of claim 11, wherein the processing circuitry is further configured to:

change a frequency spectrum allocated to the unique color of at least one node of a pair of nodes; and send the changed frequency spectrum to each GAA radio comprising the at least one node, wherein each such GAA radio is configured, upon receipt of the changed frequency spectrum, to then transmit in the changed frequency spectrum.

14. The apparatus of claim 11, wherein the processing circuitry is further configured to:

upon performing (a):

determine that the total bandwidth is greater than the incumbent free bandwidth for at least one pair of frequency spectrum between which the first guard band was inserted, then for each pair identify at least one of a dominant color and at least one non-dominant color, wherein the dominant color is a color allocated to at least one node, of a connected set comprising at least one of a corresponding pair of nodes, comprising at least one GAA radio, wherein a percentage of the at least one GAA radio in the at least one node of the color of the connected set with respect to at least one GAA radio comprising each node of the connected set exceeds a threshold percentage;

for each connected set comprising at least one node of a pair of nodes, determine whether there is more than one non-dominant color assigned to nodes of a connected set;

determine that there is only one non-dominant color assigned to at least one node of the connected set, then allocate the only one non-dominant color a frequency spectrum co-channel with frequency spectrum associated with a protection point whose neighborhood encompasses at least one GAA radio comprising the at least one node, of the connected set, assigned to the only one non-dominant color, wherein co-channel means same as or a subset of;

determine that there is more than one non-dominant color assigned to nodes of a connected set, then for each non-dominant color of the connected set, determine a reduction ratio of a maximum transmit power of each GAA radio comprising the nodes, of the connected set, assigned a non-dominant color;

determine whether the reduction ratio of at least one non-dominant color is less than a reduction threshold level;

determine that the reduction ratio of at least one non-dominant color is less than the reduction threshold level, then assign non-incumbent free frequency spectrum to each non-dominant color which has a reduction ratio below the reduction threshold level; and determine that the reduction ratio of none of non-dominant colors are less than the reduction threshold level, then either reduce a bandwidth of each frequency spectrum assigned to at least one non-dominant color or diminish a maximum transmit power level assigned to GAA radios comprising each node assigned the at least one non-dominant color.

15. The apparatus of claim 11, wherein the processing circuitry is further configured to: obtain the network graph;

identify at least one connected set, in the network graph, comprising at least one pair of nodes of different colors connected by an edge, where the one node of the pair comprises at least one GAA radio that is TDD unsynchronized with at least one GAA radio comprising the other node of the pair, wherein each of the different colors is assigned one of the pair of adjacent frequency spectrums;

identify at least one connected set of the network graph with at least one pair of nodes of different colors connected by an edge; and for each identified connected set, determine colors of the at least one pair of nodes of different colors separated by an edge.

\* \* \* \* \*